United States Patent
Lee et al.

(10) Patent No.: US 8,660,029 B2
(45) Date of Patent: Feb. 25, 2014

(54) METHOD FOR DESIGNATING A DUAL REGION

(75) Inventors: Sang Hoon Lee, Aniyang-si (KR); Su Young Park, Anyang-si (KR); Jae Won Lim, Anyang-si (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 353 days.

(21) Appl. No.: 13/142,797

(22) PCT Filed: Dec. 21, 2009

(86) PCT No.: PCT/KR2009/007638
§ 371 (c)(1),
(2), (4) Date: Sep. 2, 2011

(87) PCT Pub. No.: WO2010/076999
PCT Pub. Date: Jul. 8, 2010

(65) Prior Publication Data
US 2011/0305153 A1    Dec. 15, 2011

(30) Foreign Application Priority Data
Dec. 30, 2008    (KR) .................. 10-2008-0136247

(51) Int. Cl.
*G01R 31/08* (2006.01)
(52) U.S. Cl.
USPC ....................................... 370/252
(58) Field of Classification Search
None
See application file for complete search history.

(56) References Cited

U.S. PATENT DOCUMENTS

| | | | | |
|---|---|---|---|---|
| 2008/0192681 | A1* | 8/2008 | Lee et al. | 370/328 |
| 2008/0279152 | A1* | 11/2008 | Kim et al. | 370/331 |

FOREIGN PATENT DOCUMENTS

| | | |
|---|---|---|
| KR | 10-2006-0095991 A | 9/2006 |
| KR | 10-0691505 B1 | 3/2007 |
| KR | 10-0847874 B1 | 7/2008 |

* cited by examiner

*Primary Examiner* — John Blanton
(74) *Attorney, Agent, or Firm* — Birch, Stewart, Kolasch & Birch, LLP (57) ABSTRACT

A method for designating a dual region according to one embodiment of the present invention comprises the steps of: enabling a terminal which is in communication with a first network to calculate a channel state threshold value corresponding to data; comparing the channel state value of the first network and the channel state value of the second network, acquired using a pilot signal of a second network, with the channel state threshold value; calculating a network evaluation score of the first network; comparing the network evaluation score of the first network with a network evaluation threshold value for designating a dual region, if the channel state value of the first network and the channel state value of the second network are larger than the channel state threshold value; and determining whether to designate a dual region in accordance with the result of the comparison using the network evaluation threshold value. The method of the present invention can reduce service cutoff or delay time during inter-radio access.

12 Claims, 7 Drawing Sheets

METHOD FOR DESIGNATING A DUAL REGION

TECHNICAL FIELD

The present invention relates to wireless communication, and more particularly, to a method of evaluating and allocating two networks having different wireless environments coexist when the networks coexist.

BACKGROUND ART

A mobile terminal has recently been released in a multi-mode form having two or more wired/wireless access interfaces. With the development of wireless networking technology, wired/wireless networks having various characteristics are mixed and distributed all over the words. In this environment, a user's desire to access an optimal network is increasing in order to be supplied with the best service quality at his current position without being restricted to a specific network. A user prefers a high bandwidth and cheap communication service if possible. The users of mobile terminals want to be supplied with seamless service without being restricted to mobility while having access to heterogeneous networks.

In order to realize such communication service, there is need for technology guaranteeing common IP-based mobility which is capable of integrating, managing, and operating various kinds of access networks.

IEEE 802.21 Working Group was formed on March, 2004 in order to support seamless handover between heterogeneous networks, and relevant technology was named Media Independent Handover (MIH). In MIH technology, a multi-mode terminal having a network access interface with two or more different characteristics was taken into consideration. Furthermore, the scope of work is both handover between IEEE 802-series networks and handover between non-IEEE 802-series networks, such as handover between networks having different characteristics within IEEE 802-series networks, such as WiBro and WLAN, and handover between WiBro and a 3GPP network.

Seamless mobility service provided through IEEE 802.21 MIH technology means that quality of service is guaranteed to the extent that, when a user terminal performs handover between different heterogeneous networks, the user does not feel the degradation of quality of service by having the user satisfied with the quality of service provided in a previous network to the highest degree.

Handover between heterogeneous networks having different typical characteristics generates handover between different IP subnets. Accordingly, in this handover, a mobility management protocol for continuously maintaining IP connection in a previous network needs to be performed. A delay problem according to IP setting, subnet mobile detection, and mobility registration processing in a new network has been pointed out in IP mobility management protocols, such as Mobile IP and Proxy Mobile IP. This problem required close association with an underlying layer.

IEEE 802.21 MIH technology stipulates a structure, service, and a protocol procedure in which a mobility management protocol optimizes the performance of user application service upon handover between heterogeneous networks through close association with underlying physical and link layers.

Accordingly, researches are being carried out on technology for supporting the mobility of wireless communication terminals through MIP (Mobile IP), major mobility support technologies extended from MIP, and information exchange and mutual actions between heterogeneous networks.

DISCLOSURE

Technical Problem

The present invention is intended to provide technology capable of guaranteeing radio resource efficiency and quality of service through efficient session control for each network in an area in which service can be provided over heterogeneous networks.

Furthermore, the present invention is intended to provide a method of guaranteeing the mobility of a user by minimizing the cutoff of service when a moving user is provided with service over heterogeneous networks.

Furthermore, the present invention is intended to increase bandwidth efficiency and reduce the user delay time when handover between heterogeneous networks is performed.

Technical Solution

According to an aspect of the present invention, there is provided a method of designating a dual region, comprising the steps of a terminal, being in communication with a first network, calculating a channel state threshold value corresponding to data, comparing the channel state threshold value with each of a channel state value of the first network and a channel state value of a second network obtained using a pilot signal of the second network, calculating a network evaluation score of the first network, if each of the channel state value of the first network and the channel state value of the second network is greater than the channel state threshold value, comparing the network evaluation score of the first network with a network evaluation threshold value for designating the dual region, and determining whether to designate the dual region according to a result of the comparison using the network evaluation threshold value.

Advantageous Effects

According to embodiments of the present invention, radio resource efficiency and quality of service can be guaranteed through efficient session control for each network in an area in which service can be provided over heterogeneous networks. Furthermore, the mobility of a user can be guaranteed by minimizing the cutoff of service when a moving user is provided with service over heterogeneous networks.

Furthermore, according to embodiments of the present invention, when handover between heterogeneous networks is performed, bandwidth efficiency can be increased and the user delay time can be reduced.

MODE FOR INVENTION

Figure 1:
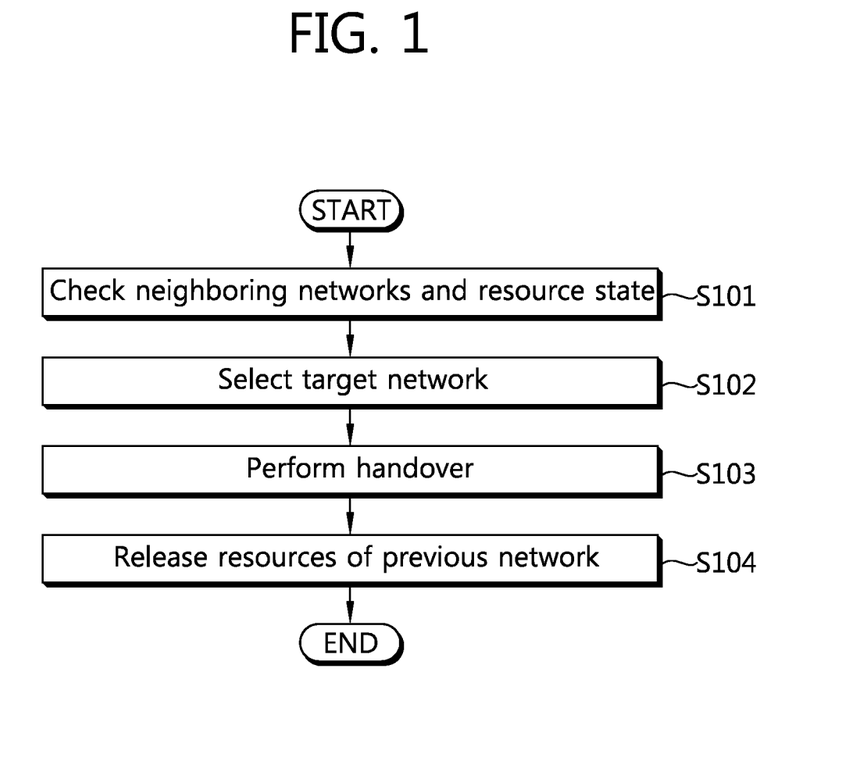
FIG. 1 is a flowchart illustrating a handover process according to the MIH.

FIG. 1 is a flowchart illustrating a handover process according to the MIH.

IEEE 802.21 defines an MIH procedure in order to support the selection of an optimal target network which can transparently guarantee the quality of application service to the highest degree in a heterogeneous network environment.

The MIH procedure is different from a layer 2 handover execution procedure defined in radio access technologies, such as 3GPP RAN, IEEE 802.16e, and IEEE 802.11r, or a handover execution procedure between the same IP subnets, such as Mobile IP and Proxy Mobile IP.

The MIH procedure means a protocol execution procedure between remote MIHF entities for selecting a target network from heterogeneous networks. Optimal target network information obtained through the MIH procedure is utilized to optimize the performance of an upper mobility management protocol.

The entire process of handover according to the MIH is described below with reference to FIG. 1. A case where a mobile-initiated handover in which the handover is started from a mobile terminal is described below as an example.

The MIH procedure chiefly includes i) a step of checking available resources for neighboring networks, ii) a step of preparing resources for a target network according to the selection of the target network, iii) a handover execution step of securing the connectivity of a layer 2 and updating IP address information pertinent to a layer 3, and iv) a step of releasing resources that have been used in a previous network by informing the completion of handover execution. As a preliminary preparation step, there is a process of obtaining information about a neighboring network from an MIH information server.

It is first checked whether there is a neighboring network capable of satisfying quality of service (e.g., delay and bandwidth), now provided in a network, by checking the resource available states of neighboring networks at step S101.

A target network is finally selected from the candidate neighboring networks according to a user profile and a handover principle at step S102. Next, resources for a mobile terminal are prepared in the selected target network, and handover to the target network is performed between heterogeneous networks at step S103. If it is checked that the handover has been executed, resources used in a previous network are released at step S104.

Figure 2:
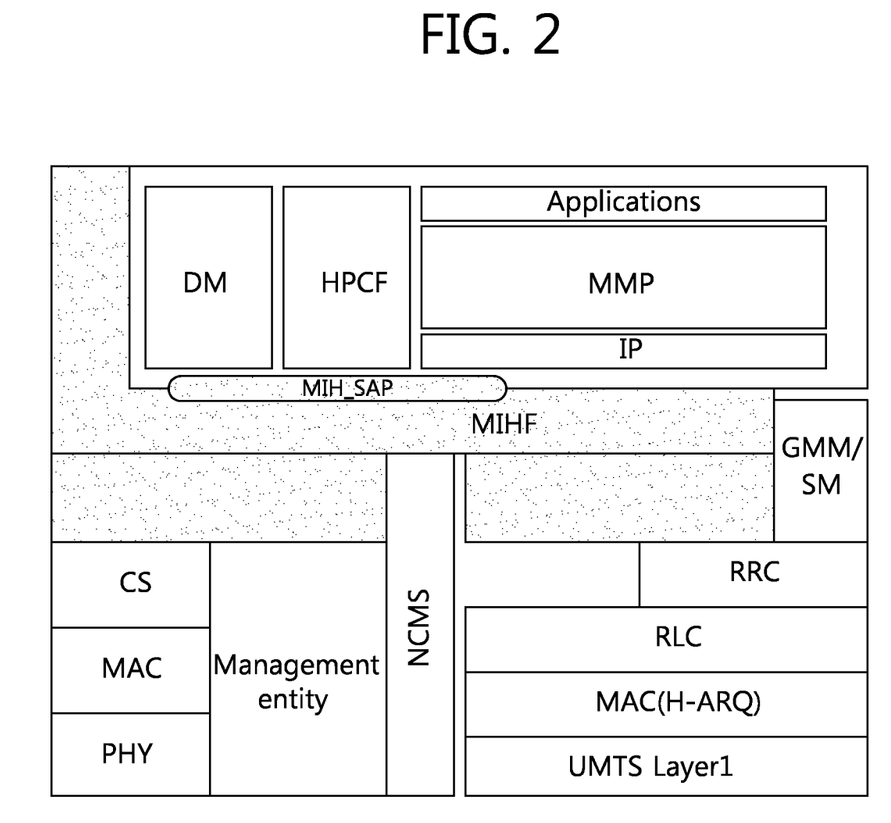
FIG. 2 is a block diagram showing the protocol structure of a mobile terminal which is applied to the MIH.

FIG. 2 is a block diagram showing the protocol structure of a mobile terminal which is applied to the MIH.

FIG. 2 shows the protocol structure of a mobile device according to 802.16 for supporting 802.21 MIH. In a structure in which a terminal can access a network according to 802.16 and UMTS at the same time, an MMP (Mobile Management Protocol) determines handover between heterogeneous networks by synthesizing the data of the networks received from an MIHF (Media Independent Handover Function).

In the protocol structure, i) a CS (Convergence Sublayer), MAC (Medium Access Control), PHY (physical), a Management Entity, and an NCMS (Network Control and Management System) are parts for supporting 802.16 network access, ii) RRC, RLC (Radio Link Control), MAC (H_ARQ), and UTMS Layer 1 are parts for supporting 3GPP. Furthermore, in the figure, iii) shaded parts are parts for supporting 802.21.

The physical (PHY) layer provides an upper layer with information transfer service using a physical channel. The PHY layer is connected to the upper Medium Access Control (MAC) layer through a transfer channel. Data is moved between the MAC layer and the PHY layer through the transfer channel. Furthermore, data is moved between different PHY layers (i.e., PHY layers on the transmission side and the reception side) through the physical channel.

The MAC layer provides service to the RLC (Radio Link Control) layer (i.e., an upper layer) through a logical channel. The Radio Resource Control (hereinafter referred to as an 'RRC') layer is defined only in the control plane.

The RRC layer is related to the configuration, re-configuration, and release of Radio Bearers (RBs) and responsible for control of the logical channels, the transfer channels, and the physical channels. If there is RRC connection between the RRC of a terminal and the RRC of a network, the terminal is in an RRC-connection mode. If not, the terminal is in an RRC idle mode.

Meanwhile, the MIHF (Media Independent Handover Function) is a function entity placed in the middle level between the protocol, application, or management function of a layer 3 or higher and the device driver of a layer 2 or lower. The MIHF transfers network state information, etc., generated in the lower device driver, to an upper layer (e.g., a Mobility Management Protocol (MMP)) so that the upper layer can optimize performance according to mobility processing in the IP layer or higher.

The MIHF also supports an upper layer so that the upper layer can control the lower device driver. For example, in order for handover between heterogeneous networks to be smoothly performed, the MIHF newly defines an MIH information base and stores pieces of information about neighboring networks. Alternatively, the MIHF changes a network access state, responds to questions about a network characteristic and state information, and provides information about neighboring heterogeneous networks through communication with an MIH information server placed in a remote place.

The pieces of information about neighboring heterogeneous networks may include, for example, the identifiers of a radio access device and an IP router, a MAC address, an IP address, and a network operating company.

For efficient handover between heterogeneous networks, there is a proposal to modify the protocol structure of a mobile device so that pieces of QoS information can be exchanged between layers.

Figure 3:
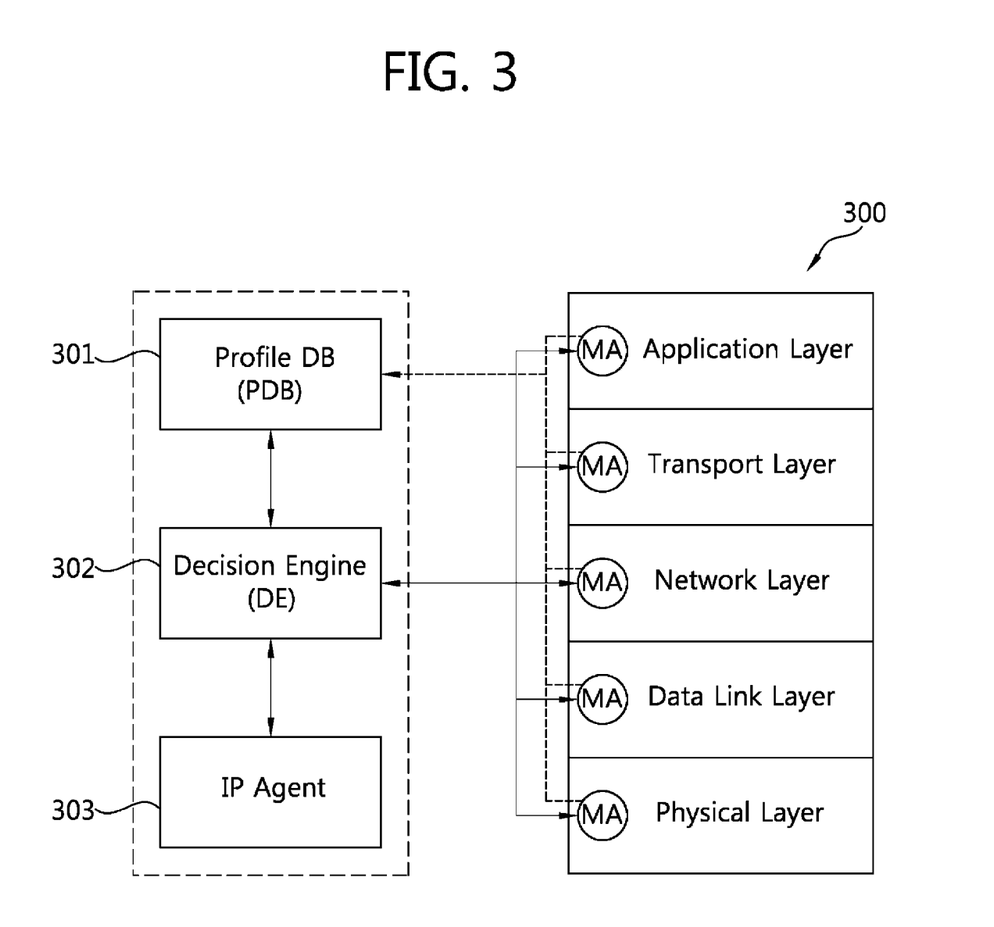
FIG. 3 is a diagram showing a platform structure according to the MIH.

FIG. 3 is a diagram showing a platform structure according to the MIH.

The structure and operating method of a mobility management platform for each cross-layer-based application for achieving mobility management and seamless handover are described with reference to FIG. 3. The shown platform is executed in an end terminal, and any change is not required at the network stage. Functional modules, constituting the platform, and a conceptual relationship between the modules are described.

As shown in FIG. 3, the platform includes four kinds of modules, such as a Monitoring Agent (MA) 300, a Profile Database (PDB) 301, a Decision Engine (DE) 302, and an IP Agent 303. The MA and the PDB in each protocol layer are functional modules for facilitating efficient communication between the layers.

The MA 300 includes an application layer, a transport layer, a network layer, a data link layer, and a physical layer. Each of the protocol layers of the MA 300 monitors and gathers pieces of dynamic state information, such as a current state of a terminal, link state information about an accessible network, and information about available resources and transfers them to the PDB 301.

The MA 300 monitors and gathers the pieces of dynamic state information in each protocol layer. The MA 300 also plays a role of an interface for each of the existing protocol layers in order to adjust protocol control without a direct change to the existing protocols.

The PDB 301 updates the dynamic state information for each layer received from the layer of the MA 300 and stores pieces of static state information, such as user preference, capabilities related to the standard of a terminal, and capabilities for each radio access network.

The PDB 301 maintains both the static information and the dynamic information necessary to determine handover. In particular, the dynamic information is updated by the MA 300 of each protocol layer. Furthermore, the dynamic state information for each protocol layer, gathered by the PDB 301, is cross-layer information necessary to determine handover and may be used very usefully. The DE 302 maintains a handover processing policy for each application so that seamless handover for each user session can be performed.

The DE (Decision Engine) 302 receives the various pieces of static and dynamic state information from the PDB 301 and enables handover to be executed based on information about important parameters previously defined in each protocol layer.

Furthermore, the IP Agent 303 functions to map the end address of a session, now being in progress, to an address corresponding to a current location. That is, the IP Agent 303 helps data transfer connection to remain intact during handover by finding the current location of a counterpart terminal and tracing a change of the IP address of an end terminal.

However, in 802.21 MIH, the following problems may occur.

First, parameters necessary when handover between heterogeneous networks is performed need to be shared between network access networks. It means that pieces of sensitive information must be shared between network providing companies.

Second, time delay and an overhead in a signal flow are generated in a process of the parameters of each access network being negotiated. They are restrictions always existing from the past when handover between heterogeneous networks is performed. Pieces of information about access networks are previously stored in an information center, but there is a possibility that service may be cut off owing to delay time occurring because of the exchange of signals necessary between networks in handover between heterogeneous networks.

Third, a compatibility problem between the existing mobile device and the nodes of an access network now installed may occur. This problem requires costs and the time because all the structures of nodes and mobile devices which have been developed and commercialized must be changed in order to realize 802.21 MIH.

In a method proposed according to an embodiment of the present invention, since a session for each application service is formed, an optimal network for maintaining service is selected, and the service is provided by one network. Delay time is generated through handover occurring between networks.

It is assumed that a mobile device used in an embodiment of the present invention is a terminal capable of supporting a multi-network mode and enabling simultaneous transmission and reception over heterogeneous networks. Furthermore, the terminal can transmit or receive the same data or different data simultaneously with the elements of each network.

Furthermore, an embodiment of the present invention proposes a network evaluation method in which QoS of the application layer is taken into consideration for handover between heterogeneous networks. There is also proposed a dual queue structure corresponding to each network in order to process mutual layer-optimized signals for applying a network evaluation score (i.e., network evaluation results) to the application layer and downloaded data to be transferred from the application layer to each network.

Furthermore, a region in which different networks provide service at the same time in order to improve a bandwidth actually used by a user and thus improve QoS is called a dual region. A method of allocating network resources is described below in which a network evaluation score is taken into account in the physical layer in a situation in which uplink transmission and downlink transmission are performed.

Figure 4:
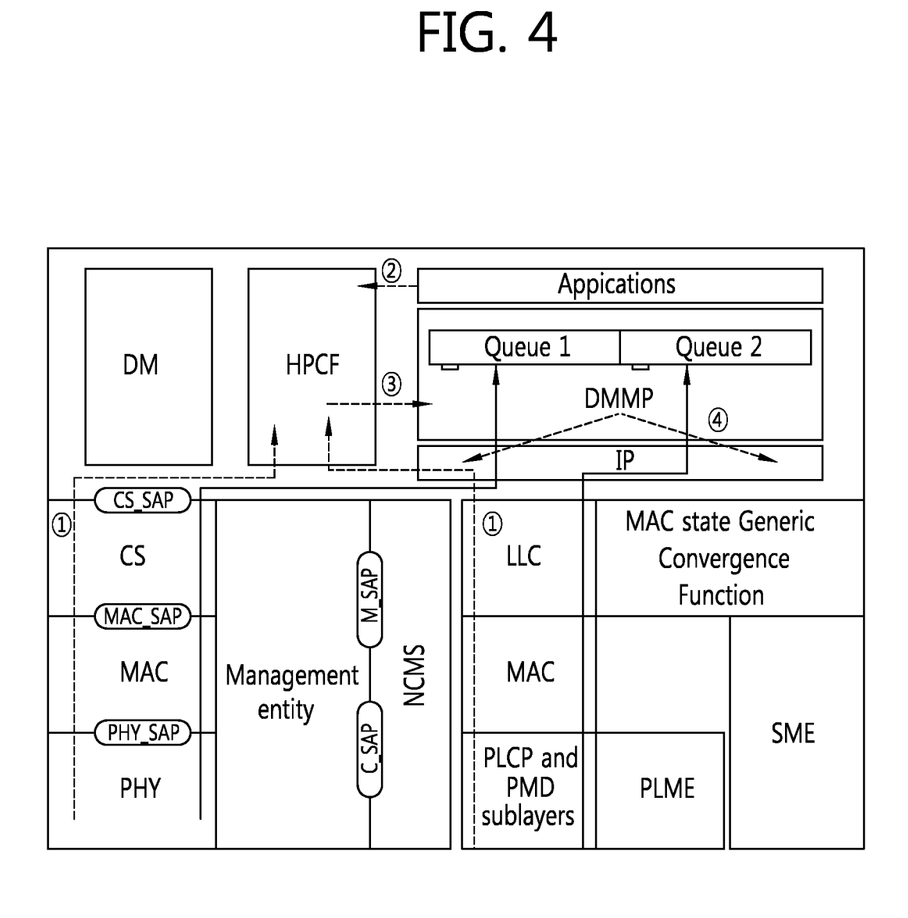
FIG. 4 is a diagram showing the protocol structure and signal flow of a mobile terminal to which a network is allocated according to an embodiment of the present invention.

FIG. 4 is a diagram showing the protocol structure and signal flow of a mobile terminal to which a network is allocated according to an embodiment of the present invention.

FIG. 4 shows a protocol structure and signals which are necessary for the proposed method to be performed in the terminal by taking networks according to 802.11 and 802.16 as examples. From the protocol structure of the terminal shown in FIG. 4, it can be seen that the terminal supports both communication with the network according to 802.11 and communication with the network according to 802.16. Here, the network according to 802.11 and the network according to 802.16 may be a first network and a second network, respectively.

Here, i) like in the case of FIG. 2, CS, MAC, PHY, Management Entity, and NCMS are parts for supporting 802.16, and ii) Logical Link Control (LLC), Medium Access Control (MAC), a Physical Layer Convergence Protocol (PLCP), Physical Medium-Dependent (PMD) sublayers, a Physical Layer Management Entity (PLME), a Station Management Entity (SME), and an MAC State Generic Convergence Function are parts for supporting 802.11.

In the protocol structure shown in FIG. 4, major layers pertinent to the embodiment of the present invention are described below.

Here, two queues Queue 1 and Queue 2 are placed over an IP layer, and the queue 1 and the queue 2 receive data from different networks.

A Handover Policy Control Function (HPCF) is a protocol for receiving information about a wireless channel situation of each network and information about service to be performed from a lower layer through an application layer and performing network evaluation.

A Dual Mobility Management Protocol (DMMP) receives each network evaluation score from the HPCF layer and transmits a signal to the application layer so that data for service can be separated and duplicated. Furthermore, the DMMP functions to control data, received from the application layer or transferred, using a signal received from the HPCF layer in each queue.

The names and roles of signals are defined below.

In FIG. 4, a solid line indicated the flow of a data signal, and a dotted line indicates the flow of a control signal.

☐ Network channel information: Indicates state information (e.g., CINR (the number of access users)) about the second layer or lower of each network. The network channel information is transferred from the PHY layer to the HPCF layer.

☐ Application layer QoS parameter: Indicate QoS restriction conditions. For example, there are a maximum allowable delay time, a minimum requirement data rate, and so on. The application layer QoS parameter is transferred from the application layer to the HPCF layer.

□ A network evaluation score parameter is a network evaluation score according to QoS parameters. A process of calculating the network evaluation score parameter is described later. The network evaluation score parameter is transferred from the HPCF layer to the DMMP layer and then transferred from the DMMP layer to the IP layer (□).

In addition, there is a network allocation parameter. The network allocation parameter is a parameter indicating the allocation of network resources according to the network evaluation score. Furthermore, a mutual layer optimization parameter indicates an application layer transfer parameter according to the network evaluation score.

Data and sessions may be formed when the two queues are used in the dual region according to the signals shown in FIG. 4. The terminal has the two queues, corresponding to respective networks, between the application layer and the IP layer. Accordingly, the terminal can separate sessions, corresponding to the respective networks, and controls the separated sessions.

Furthermore, the terminal may use one IP address (Home Address), but the two queues may be distinguished from each other using different port numbers. If this method is applied to a Mobile IP environment, Care of Addresses (CoAs) (i.e., address values corresponding to the respective networks) are allocated, and tunneling corresponding to each of the networks is performed.

Figure 5:
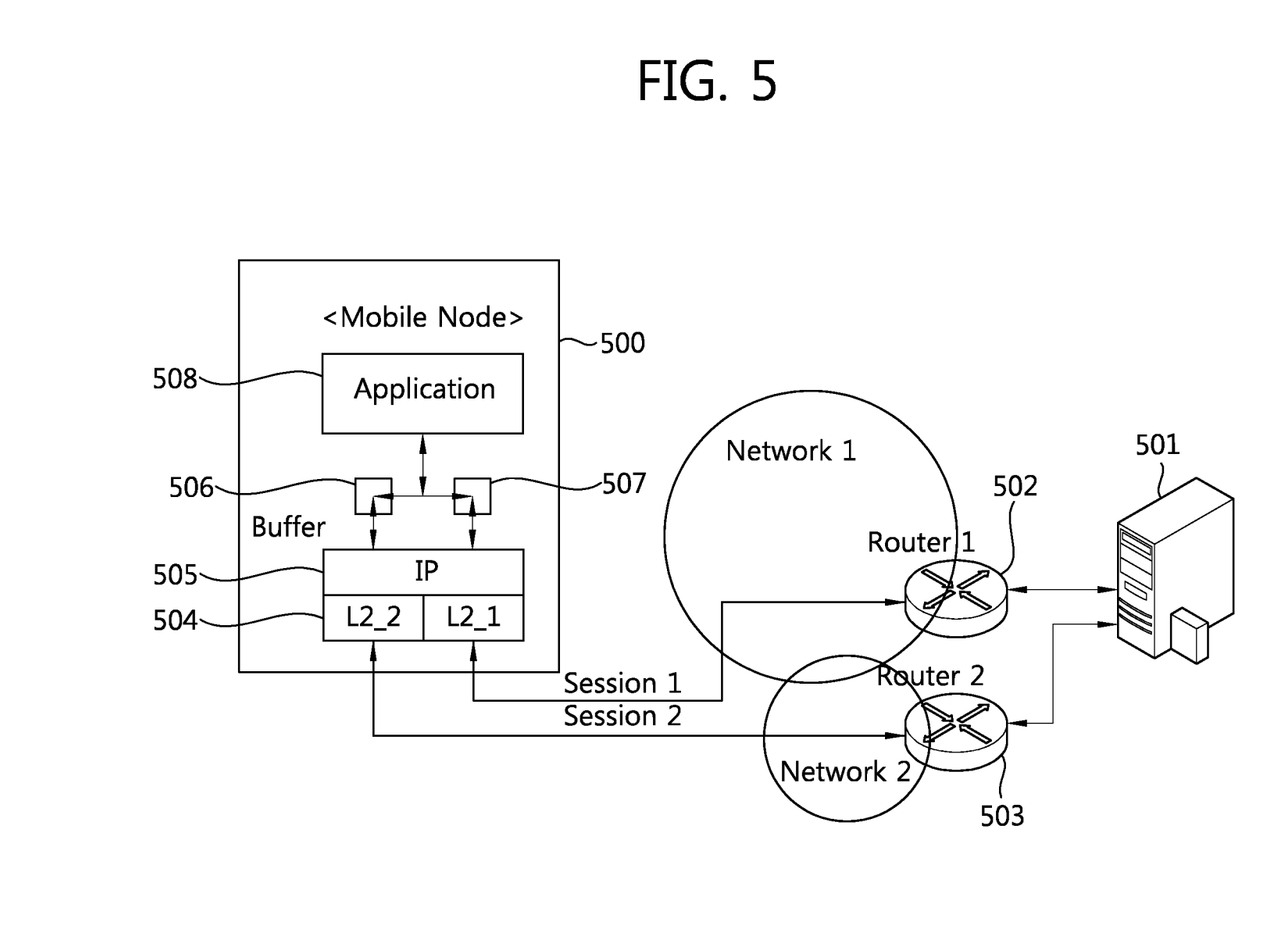
FIG. 5 is a diagram showing the flow of a signal when data is transferred according to an embodiment of the present invention.

FIG. 5 is a diagram showing the flow of a signal when data is transferred according to an embodiment of the present invention.

FIG. 5 is a diagram for a data transfer method using the dual queue on a network. In the case of downlink, data transferred by an LMA (Local Mobility Anchor) 501 is distributed into the router 1 502 of a network 1 and the router 2 503 of a network 2 and duplicated and then transferred to a terminal 500.

The LMA 501 allocates the home prefix of the terminal 500 and manages the connection state of the terminal 500. The LMA 501 may also play a role of a Home Agent (hereinafter referred to as an 'HA').

The terminal 500 which has received data receives data from the lower layer of a layer 2 (L2) 504 or lower and transfers the data to each of a queue 1 506 and a queue 2 507, corresponding to the respective networks, through an IP layer 505. Each of the queues composes and selects the data and transfers them to an application layer 508.

Furthermore, upon uplink, the application layer 508 of the mobile device distributes and duplicates the data so that the data is suitable for each of the networks and transfers the data to each of the queue 1 506 and the queue 2 507. The data transferred to the queue 1 506 and the queue 2 507 is transferred to the LMA 501, connected to an external network, via the IP layer 505 and the second layer 2 (L2) 504 and the router 1 502 and the router 2 503 of the respective networks.

Figure 6:
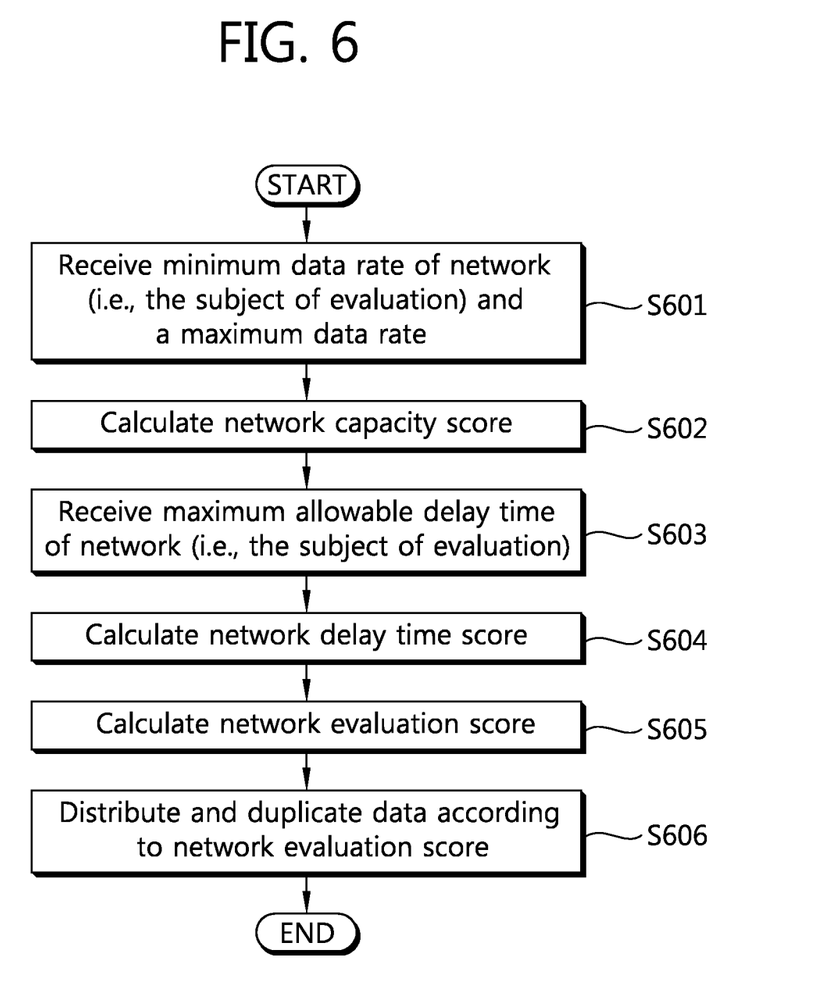
FIG. 6 is a flowchart illustrating a network evaluation process according to an embodiment of the present invention.

FIG. 6 is a flowchart illustrating a network evaluation process according to an embodiment of the present invention.

Network evaluation is performed based on information about the channel state of each network, gathered by the Handover Policy Control Function (HPCF) of a terminal from a lower layer, and information about data (i.e., QoS parameter for data), gathered from the application layer and now being processed.

Network evaluation is performed through the following method.

First, a minimum data rate, required for each service type of a network (i.e., the subject of evaluation), and a maximum data rate necessary for service are received from the application layer at step S601. A network capacity score is calculated based on the minimum data rate and the maximum data rate at step S602. In order to calculate the network capacity score, Equation 1 is used. Equation 1 for calculating the network capacity score is as follows. In Equation 1, $U_{rate}$ indicates the network capacity score, max indicates the maximum data rate, and min indicates the minimum data rate. c indicates a data rate that a network (i.e., the subject of evaluation) actually provides data to a user.

$$U_{rate} = \begin{pmatrix} 0 & c < \min \\ \log_2\left(1 + \frac{c - \min}{\max - \min}\right) & \min \leq c < \max \\ 1 & \max \leq c \end{pmatrix} \quad \text{[Equation 1]}$$

If Equation 1 is used, efficiency of network resources can be maximized by guaranteeing the connectivity of service through the minimum data rate and also taking the maximum data rate into account in Equation.

Next, a maximum allowable delay time required for each service type is received from the application layer at step S603. A network delay time score is calculated based on the maximum allowable delay time according to Equation 2 below at step S604. Here, $U_{delay}$ is the network delay time score, and delay indicates the maximum allowable delay time received from the application layer.

$$U_{delay} = \begin{pmatrix} \frac{2\max}{\max - \text{delay}} - 1 & 0 \leq \text{delay} < \max \\ 0 & \max \leq \text{delay} \end{pmatrix} \quad \text{[Equation 2]}$$

A network evaluation score is calculated by multiplexing the calculated network capacity score and the calculated network delay time score at step S605. The calculated network evaluation score is transferred to the application layer and the dual mobility management protocol.

The application layer which has received the network evaluation score distributes and duplicates data according to the network evaluation score for each network and prepares to generate data to be transferred to each network at step S606. In this process, data is generated by controlling the amount of data that may be transmitted over all available networks. If only one network can be used, data is generated based on the capacity of the one network.

Figure 7:
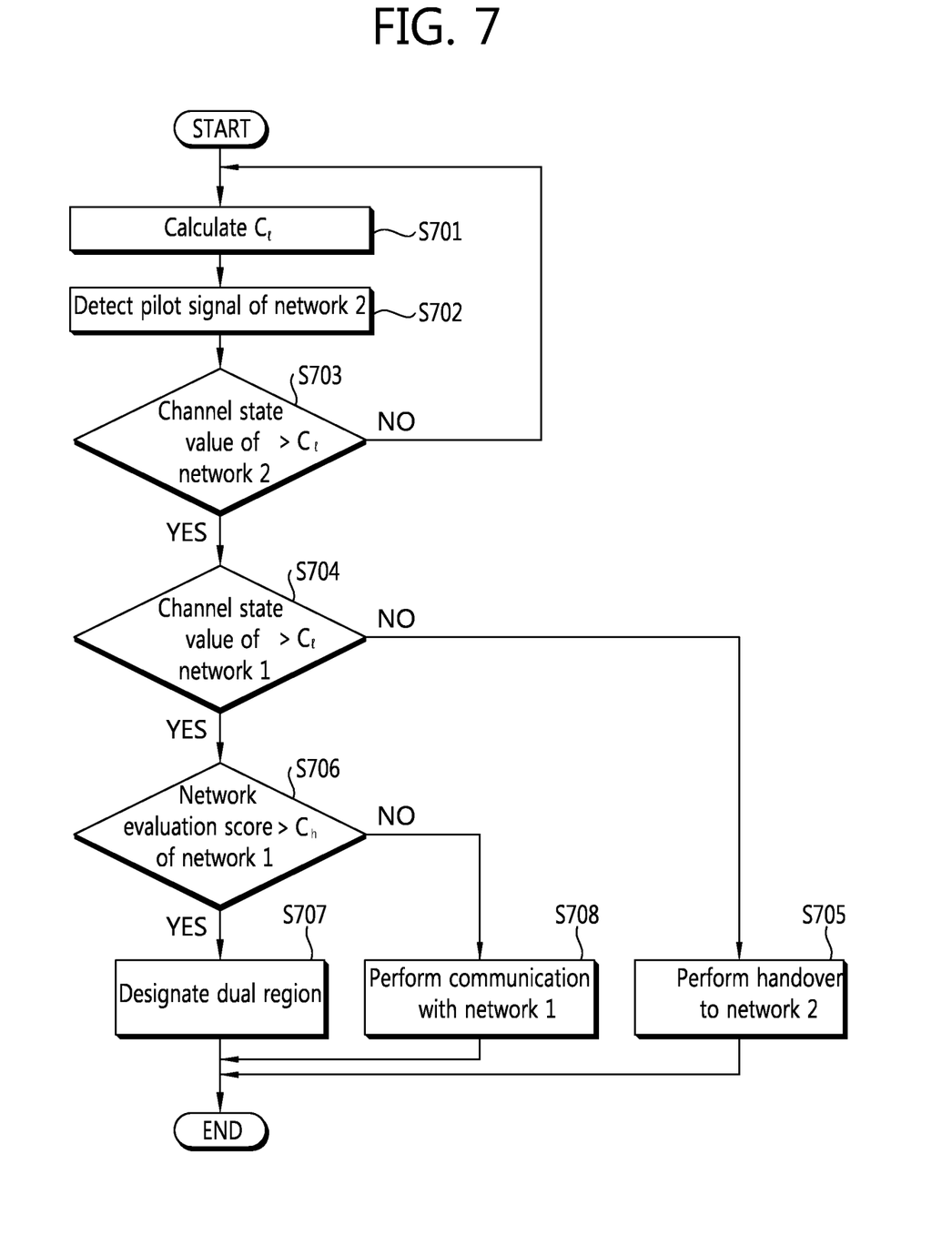
FIG. 7 is a flowchart illustrating a method of designating a dual region according to an embodiment of the present invention.

FIG. 7 is a flowchart illustrating a method of designating a dual region according to an embodiment of the present invention. Referring to FIG. 7, there is shown the method of designating a dual region through network evaluation when data is transferred.

A terminal is in the state in which it is connected to a network 1 and is performing communication. The Dual Mobility Management Protocol (DMMP) performs communication according to different methods in uplink and downlink. In the case of uplink, the DMMP receives evaluation results for a network, calculated by the HPCF, and performs network allocation. A network allocation result (e.g., a cross layer optimization parameter) is transferred to the application layer so that original data can be separated and duplicated based on the state of each network.

First, the terminal inputs data in a buffer or knows that there is data to be received. The terminal calculates $C_l$ corresponding to the data at step S701. $C_l$ is a minimum network condition for providing service, and it indicates a channel state threshold value indicating a minimum channel stat required between the terminal and the network.

When uplink data is transmitted, the terminal calculates $C_l$ according to type of the uplink data inputted to the buffer and stores the calculated $C_l$. Meanwhile, when downlink data is transmitted, the terminal knows that there is data to be received from the network 1 and checks the type and capacity of the downlink data to be received through session information. The terminal may calculate the channel state threshold value $C_l$ according to the checked type of the downlink data and store the calculated channel state threshold value $C_l$.

Next, the terminal detects the pilot signal of a network 2 at step S702. Furthermore, the terminal checks a channel state value of the network 2 using the pilot signal. That is, the terminal checks whether communication with the network 2 is possible by comparing the channel state value of the network 2 and the channel state threshold value $C_l$ at step S703. If the channel state value of a specific network is the channel state threshold value $C_l$ or smaller, the specific network is determined to be inappropriate for communication with a terminal.

If the channel state value of the network 2 is greater than $C_l$, the terminal compares the channel state value of the network 1 and $C_l$ at step S704. If, as a result of the comparison, the channel state value of the network 1 is $C_l$ or smaller, it means that the network 1 no longer provides service to the terminal. Accordingly, the terminal performs handover to the network 2 as quickly as possible at step S705.

However, if the delay time consumed to perform handover to the network 2 is shorter than the time taken to use a channel or the time that the terminal stays in a cell, it is better not to perform handover.

If the channel information of the network 1 indicates a value greater than $C_l$, it means that communication with the network 1 is possible. Accordingly, the terminal determines the network 1 on the basis of $C_h$ at step S706. $C_l$ is the threshold value for checking whether communication with a specific network is possible, whereas $C_h$ is a threshold value for checking whether communication with another network is necessary.

That is, if the network evaluation score of the network 1 is greater than $C_h$, it means that the network 1 can sufficiently provide service to the terminal without help of the network 2. If the network evaluation score of the network 1 is $C_l$, or smaller, it means that a dual region with the network 2 needs to be designated. Here, the channel state value of each of the network 1 and the network 2 should be greater than $C_l$.

$C_h$ is hereinafter referred to as a network evaluation threshold value. The network evaluation threshold value may be set based on various numerical values, such as a network evaluation score, a channel state value, and a capacitance value corresponding to a network, and an example of them is described below. If a maximum network evaluation score satisfactory for a user is 0.7, the network evaluation threshold value $C_h$ may be defined as a channel capacity value corresponding to the maximum network evaluation score of 0.7.

If the number of users now being served by the network 2 is equal to larger than the number of users that may be served by the network 2, the terminal dos not designate a dual region including the network 2. Even if the dual region is designated, the terminal restrains data transfer through the network 2.

If the network 2 is determined to be required in order to provide an optimal service to a user, the terminal designates a relevant region as a dual region at step S707. Furthermore, the terminal receives radio resources for the network 2 allocated thereto. Here, network resources may also be allocated by applying each network evaluation score to a water filling method.

If the network evaluation score of the network 1 is greater than $C_h$, it means that, as described above, a sufficient degree of service can be provided to the terminal over only the network 1 without additional connection to the network 2. Accordingly, in this case, the terminal performs communication over only the network 1 without designating the dual region and maintains the same state as that before at step S708.

When uplink data is transmitted, the terminal may transmit the uplink data to both the network 1 and the network 2.

When downlink data is transmitted, the terminal first allocates, to a user close to a base station, power through which a maximum value of QoS can be provided to the user so that the number of users served at the relevant point of time can be increased.

Here, as described with reference to FIG. 5, the terminal transmits and receives data using the dual queue. The queue 1 controls connection with the first network and the transmission and reception of data to and from the first network, and the queue 2 controls connection with the second network and the transmission and reception of data to and from the second network. Furthermore, data transmitted from the terminal to the first network or the second network is uplink data, and data received by the terminal from the first network or the second network is downlink data.

Furthermore, in the case of uplink data, the uplink data to be transmitted to the first network is distributed and duplicated according to the second network when a dual region is designated and then generated again.

Here, the queues existing on the protocol within the terminal may be referred to as an input and output unit, a network connection unit, or a network control unit which corresponds to each network. Accordingly, the queue 1 may be referred to as a first input and output unit, a first network connection unit, a first network control unit or the like. Likewise, the queue 2 may be referred to as a second input and output unit, a second network connection unit, a second network control unit or the like. That is, sessions to the first network and the second network are independently controlled within the terminal.

If the dual region is designated by performing network evaluation as in the proposed method, a minimum data rate required for each service can be guaranteed and thus connection durability of the service can be guaranteed. Furthermore, efficiency in using a network can be maximized because a maximum data rate for providing service is taken into account.

According to the method using the dual queue as in the embodiment of the present invention, two sessions for supporting respective networks at the same time through two ports are generated. Accordingly, service can be provided without session cutoff when handover is performed. Furthermore, since each network is allocated to each session, session control can be independently performed by updating session information corresponding to each network. Accordingly, mutual layer optimization can be performed.

If a specific region is designated as a dual region, the handover delay time (i.e., an advantage of soft handover) can be reduced and a ping pong effect can also be reduced. In this process, since different data is transmitted over a different network unlike in soft handover, frequency efficiency is not reduced, and a provided data rate can be increased.

Furthermore, mutual layer optimization can be achieved because network resources are allocated using a network evaluation score in a dual region.

The number of users provided with QoS of a certain level (e.g., a minimum level required for a user) or higher and the number of users provided with a maximum QoS can be increased at the same time.

All the methods described above may be executed by a microprocessor, a controller, a microcontroller, or a processor such as an ASIC (Application Specific Integrated Circuit) according to software or program codes coded to execute the methods. The design, development and implementation of the codes may be said to be evident to those skilled in the art based on the description of the present invention.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of designating a dual region performed by a terminal in a first network, the method comprising the steps of:
calculating a channel state threshold value corresponding to data;
comparing the channel state threshold value with each of a channel state value of the first network and a channel state value of a second network obtained using a pilot signal of the second network;
calculating a network evaluation score of the first network;
if each of the channel state value of the first network and the channel state value of the second network is greater than the channel state threshold value, comparing the network evaluation score of the first network with a network evaluation threshold value for designating the dual region; and
determining whether to designate the dual region according to a result of the comparison using the network evaluation threshold value.

2. The method of claim 1, further comprising the step of maintaining only the communication with the first network without designating the dual region, if the network evaluation score of the first network is greater than the network evaluation threshold value.

3. The method of claim 1, further comprising the step of designating the dual region, if the network evaluation score of the first network is the network evaluation threshold value or smaller.

4. The method of claim 3, further comprising the step of receiving radio resources allocated thereto for the second network, if the dual region in which communication with both the first network and the second network is performed is designated.

5. The method of claim 1, further comprising the step of inputting uplink data to a buffer when the data is the uplink data, wherein the channel state threshold value is calculated using one or more of a type and capacity of the uplink data.

6. The method of claim 1, further comprising the step of checking a type and capacity of downlink data based on session information received from the first network when the data is the downlink data, wherein the channel state threshold value is calculated using one or more of the checked type and capacity of the downlink data.

7. The method of claim 1, wherein the network evaluation score is calculated using one or more of information about a channel state of the first network and information about quality of service for processing the data in the first network.

8. The method of claim 1, wherein the network evaluation score is calculated using a network capacity score calculated using a minimum data rate and a maximum data rate, necessary in the first network and necessary for the first network to process the data, and a maximum allowable delay time which is a maximum delay time permitted when data is transmitted over the first network.

9. The method of claim 1, wherein when designating the dual region, connection or data transfer with the first network and connection or data transfer with the second network are independently controlled.

10. The method of claim 9, wherein:
the connection or the data transfer with the first network is managed through a first input and output unit, and
the connection or the data transfer with the second network is managed through a second input and output unit different from the first input and output unit.

11. The method of claim 10, further comprising the steps of:
when the data is uplink data, distributing and duplicating uplink data to be transmitted to the second network according to the second network, the uplink data to be transmitted to the second network being different from the uplink data to be transmitted to the first network; and
transmitting the uplink data to the first network and the second network, respectively, through the first input and output unit and the second input and output unit.

12. The method of claim 10, further comprising the step of, when the data is downlink data, receiving downlink data, transmitted by the first network, through the first input and output unit and receiving downlink data, transmitted by the second network, through the second input and output unit.

* * * * *